United States Patent [19]

Long et al.

[11] 3,905,776

[45] Sept. 16, 1975

[54] METHOD OF MAKING A THIN, FERRO-MAGNETIC MEMORY LAYER AND ARTICLE MADE THEREBY

[75] Inventors: Kenneth E. Long, Cleveland Heights, Ohio; David W. Taylor, Edgemont, Pa.

[73] Assignee: Nico Magnetics, Inc., Wilmington, Del.

[22] Filed: July 5, 1973

[21] Appl. No.: 376,856

[52] U.S. Cl. .................... 29/183.5; 29/199; 204/23; 204/28; 204/48; 340/174 TF; 340/174 PW

[51] Int. Cl.$^2$. C25D 3/12; B23P 3/00; G11C 11/02; G11C 11/04

[58] Field of Search ......... 204/48, 112, 113, 23, 28; 106/1; 340/174 NA, 174 TF, 174 PW; 29/183.5, 199

[56] References Cited

UNITED STATES PATENTS 3,697,391 10/1972 Passal .................................. 204/43

FOREIGN PATENTS OR APPLICATIONS 427,458 4/1935 United Kingdom.................. 204/48
1,127,170 4/1962 Germany ............................. 204/48

*Primary Examiner*—G. L. Kaplan

[57] ABSTRACT

A ferromagnetic layer having high information density capabilities is deposited on a suitable substrate in a thin, continuous, uniform and coherent manner utilizing a process which involves providing the substrate with a conductive copper surface and electrodepositing a ferromagnetic layer of cobalt no greater than 20 microinches, on top of the copper. The cobalt is deposited in the form of hexagonal crystals from a bath of cobalt chloride buffered with a low molecular weight carboxylic acid in a pH range of between about 3.6 and 5.8. The cobalt electrodeposit is then covered with a suitable protective layer.

6 Claims, No Drawings

METHOD OF MAKING A THIN, FERRO-MAGNETIC MEMORY LAYER AND ARTICLE MADE THEREBY

BACKGROUND OF THE INVENTION

Prior to the present invention, ferro-magnetic memory layers of several types have been available commercially, and countless others have been postulated by enterprising inventors in "paper" patents. The commercially available layers are formed on rigid substrates such as discs and drums as well as on flexible substrates such as tapes, cards, and the like, depending upon the intended end use. In general, ferro-magnetic layers comprising particles of metal oxides dispersed in organic binders applied to such substrates constitute a large percentage of commercial production to date, but thin layers of mixtures or alloys of metals without any binder overcome many of the problems connected with the oxide coatings, and these are beginning to find commercial favor for a variety of reasons.

The problems connected with oxide coated substrates prevent bit densities in excess of about 3000 bits per linear inch (B.P.I.). First, the relatively low volume of magnetic material capable of being dispersed in an organic binder limits the total magnetic energy in any given thickness of deposition, and thus puts a low finite limit on the desirably high signal voltage. Secondly, the low permeability of such coatings, and the relatively low saturation induction prevents the utilization of coatings thinner than about 100 microinches, and the popular commercial types are between 125 and 400 microinches in thickness. The consequence of such thickness is an undesirably long flux penetration time causing low bit density limitations.

Even more important, the broad range of magnetic coercivities measured in oersteds between essentially fully magnetized states, or "coercivity tolerance", due in large part to broad particle size and density distribution in such layers, is directly responsible for poor switching time from a first fully magnetized state through complete de-magnetization to a second fully magnetized state. This limitation makes higher bit density capabilities virtually impossible. Other problems connected with the oxide coated substrates are the tendency of the particles undesirably to abrade the "write-read" transducers, and the gradual disintegration of the binder causing undesirable fault counts.

The ferro-magnetic layers formed by depositing metal alloys on a substrate do not make use of organic binders, and hence there can be no faults arising from binder disintegration. However, metal depositions are in some cases thinner than oxide coatings and are susceptible to mechanical damage, such as abrasion, either of the deposition itself, or the transducers associated therewith which may cause loss of stored information. It is thus advisable to protect the ferro-magnetic layer with a coating formulated to be low in abrasion and sufficiently hard to absorb impacts without damage to the underlying ferro-magnetic layer.

Such coatings create a significant loss in signal, however, due to the separation distance between the tranducers and the ferro-magnetic layer. Increasing the thickness of the ferro-magnetic layer will overcome the signal loss, but this again results in increased penetration time for the magnetic flux causing low bit density limitations.

Metal alloy depositions presently in use, such as nickel-cobalt are somewhat higher in permeability, and thus can be made thinner to attain potentially lower flux penetration time and higher bit density capability. But the nickel and cobalt are frequently alloyed with other materials such as phosphorous or sulfur in order to control the desired magnetic parameters. The addition of these materials and others which have similar properties, inevitably results in an increase in the range of coercivities and a reduction in the magnetic permeability. The latter requires a thicker deposition for equivalent signal, and the broadening of the band of coercivities indicates that it takes a relatively long time to switch the magnetic energy from one state of magnetization to another — again causing low bit density limitations.

The use of nickel is considered disadvantageous because nickel has a low saturation induction as compared, for instance, with iron or cobalt. Furthermore, under many conditions of deposition, nickel-cobalt alloys do not exhibit a true alloy condition, but rather a mixture of the metals, and the magnetic properties are far from ideal. In some cases, the magnetic layer will exhibit more than one apparent major coercivity, with the second and tertiary coercivities at amplitudes such that error signals can readily occur. Thus, the presence of secondary coercivities is equivalent to long switching time, with the additional hazard of adding error signals to the recorded magnetic layer. In other cases, alloys of magnetic metals will create a non-symmetrical hysteresis loop and a large coercivity tolerance indicating poor switching time, although the nominal coercivity and magnetic permeability may be adequate for present day bit density capability requirements.

Considerable research and development has been conducted over a period of years to solve the foregoing long recognized problems and to produce a ferromagnetic layer with bit density capabilities suitable for use with future generations of digital computers. This is substantiated, for instance, by Moline U.S. Pat. No. 2,730,491 (January 1956) which discloses the production of a ferromagnetic layer consisting of a nickel-cobalt alloy plus sulfonamides having a nominal coercivity of about 230 oersteds, but the layer is 400 microinches thick which explains the extremely slow switching time indicated by the large coercivity tolerance evident from FIG. 2.

The Koretsky U.S. Pat. No. 3,360,397 (December 1967) discloses the chemical deposition of a ferromagnetic layer of cobalt from a bath maintained at a high pH. A citrate and/or malonate ion is used in the bath as a complexing agent. The layer is 250–5000 angstroms thick with a nominal coercivity of 600–700 oersteds, but the coercivity tolerance evident from FIG. 2 is over 80% thereof thus indicating a slow switching time.

In a later patent, U.S. Pat. No. 3,423,214, Koretsky discloses the further use of an electroless cobalt bath to deposit a ferro-magnetic layer on to a catalytic surface. The bath is maintained at a high pH of 8–9 by use of ammonium salts as a buffer. A short chain dicarboxylic acid is used as a complexing agent. The product has relatively low coercivities in the range of 20–200 oersteds.

BRIEF DESCRIPTION OF THE INVENTION

The present invention relates broadly to a method of forming a thin, ferro-magnetic memory layer on a flexible or rigid substrate whereby many of the prior art problems are overcome. More specifically, the present invention covers a method of forming on a tape, disc, drum or other suitable substrate, ferro-magnetic layer having outstanding magnetic properties and physcial characteristics. The substrate is subjected to a pre-treatment to make it responsive to the electro-deposit of a ferro-magnetic layer, which in the present invention, comprises a thin cobalt layer wherein the cobalt is in the form of hexagonal crystals. The pre-treatment, as applied to rigid substrates and flexible supports will be hereinafter described in more detail. Briefly, a rigid substrate such as a flat aluminum disc is plated with successive layers of zinc and electroless nickel preparatory to plating with cobalt. In the case of a flexible substrate such as polyester tape, the substrate is treated to make it catalytically active, after which it is provided with a conductive layer of copper before the deposition of the cobalt layer.

The cobalt is then electroplated from an aqueous bath of $CoCl_2 \cdot 6H_2O$ buffered in the pH range of about 3.6 and about 5.8 with an unsubstituted or substituted aliphatic carboxylic acid such as monochloroacetic acid. Plating is carried out at a bath temperature of about 18° – 24°C and a high current density preferably using pure cobalt material as an anode. The cobalt is typically deposited to a thickness of between about 4 and about 20 micro-inches.

DETAILED DESCRIPTION OF THE INVENTION

Copending Application Ser. No. 376,855, filed on July 5, 1973 describes in detail the pH and magnetic characteristics of a desirable ferro-magnetic layer. Suffice it to say that it is highly desirable to produce a magnetic layer that has the following characteristics and properties:

a. A thickness of less than 20 microinches and preferably less than 15 microinches;

b. A very short "switching time" which is the duration of time required for a given increment of a ferro-magnetic sample to go from a first fully magnetized state through complete demagnetization to a second fully magnetized state;

c. A nominal coercivity within the range of 200–500 oersteds, and a coercivity tolerance no greater than 40% of the nominal coercivity wherein the nominal coercivity is indicated as the field strength in oersteds required to switch an incremental amount of ferro-magnetic material from a fully magnetized state to complete demagnetization, and coercivity tolerance is the portion of the cycle wherein the incremental amount is less than fully magnetized;

d. Continuity and physical coherance;

e. Absence of undesirable mechanical stresses;

f. In the case of flexible substrates, sufficient ductility to permit the substrate to pass around small spools and capstans used in computers and other recording and read-out devices; and g. A surface which is extremely smooth, preferably with an arithmetic variation of less than 2 microinches.

The ferro-magnetic layer exhibiting the foregoing magnetic and physical characteristics is comprised primarily of cobalt metal deposited in a uniform layer. The layer is as thin as possible consistent with the ability to create a flux reversal of sufficient magnitude to generate a signal voltage in the "read" transducer sufficiently large to discriminate from inherent electrical "noise" in the system.

The magnetic layer consists of the electrodeposition products of an aqueous plating solution containing prescribed amounts of one or more cobalt salts and a buffer to control the pH.

The pH of the cobalt plating bath is very critical and should be maintained at a level of between about 3.6 and 5.8 by the use of a buffer selected from the group consisting of unsubstituted and substituted low molecular weight mono and dicarboxylic acids. Specific acids that have been found to be useful in carrying out the present invention are monochloracetic acid, acetic acid, diglycolic acid and malonic acid. Not only do these buffers closely control the pH, but in addition, appear to exert, in some unexpected way, a beneficial effect on the magnetic properties of the resultant cobalt layer.

The magnetic cobalt layer thus produced is considerably darker than a corresponding layer of pure cobalt. It is surmised that this darker layer consists of cobalt in more than one form. The formation of this layer is favored by higher values in pH and higher current densities and is suppressed by agitation of the bath. This agitation is essential in that it minimizes the tendency for the pH of the bath to rise at the surface of the substrate where plating is taking place. If the pH gets above about 5.8 there is a tendency for a dark layer of readily removable material including basic cobalt salts instead of cobalt to form on the plated surface of the substrate.

A pH value of about 3.6 is considered a minimum to obtain a close packed hexogonal structure in the plated cobalt.

The purity of the cobalt plating solution is of primary importance. Impurities, such as copper, generally found in commercially available cobalt, have an undesirable influence on the magnetic qualities of the plated cobalt layer. The cobalt is plated must be relatively free of impurities normally native to cobalt such as iron, copper, zinc, lead, bismuth, tin and gold, although small amounts, for example, 1% of nickel may be tolerated.

As a further elaboration on the invention, the following examples serve to illustrate the process of the invention as applied to rigid discs and flexible tapes.

EXAMPLE I

Deposition on a rigid substrate

An aluminum disc approximately 14.03 inches in diameter, with a centrally located mounting aperture 6.625 inches in diameter, of the type currently utilized for instance in disc packs for digital computers, is used as a rigid substrate. Briefly, the disc has a layer of zinc deposited thereon, and a layer of electroless nickel overlying the zinc. A layer of copper electroplated to the nickel provides a suitable base for the electroplating of the extremely thin cobalt layer which provides the superior magnetic characteristics of the disc according to this invention. The layer of cobalt is no more than about 10 microinches thick. Finally, a protective coating of an epoxy or other thermosetting resin with a magnetically transparent filler such as a mixture of titanium dioxide and trivalent chrome oxide, approximately 0.0002 inch thick, is provided on the magnetic cobalt layer. While both sides of the disc are ordinarily coated in this manner, the invention likewise contemplates discs with coatings on one side only.

In more detail, the magnetic disc is fabricated by a process which deposits the necessary layers in sequence. The first step consists of providing the aluminum metal disc approximately 0.062 inch thick, such as may be obtained from Kaiser Aluminum Company, Reynolds Metals Company, or Alcoa Aluminum. An aluminum alloy including 4.0% magnesium and 0.5% manganese, coded 5086, has been prepared and plated satisfactorily according to this invention, and at present it appears to be adequate in every respect. The discs are unannealed as purchased, and the dimensions may be outside the aforesaid tolerances now deemed important for practicing this invention.

Each disc is first sanded manually to remove any burrs or projections to insure correct contact with the vacuum chuck of a turret lathe. The disc is mounted on the vacuum chuck and the inner and outer diameters are both turned without removing the disc from the chuck to insure concentricity, and the tools may also be shaped to properly chamfer the edges of the disc simultaneously.

The disc is then annealed between meehanite cast iron weights. Conveniently, a stack of about ten discs is pressed between the weights, which may weigh in the neighborhood of 50 pounds each, and which are lapped to present an extremely flat and smooth surface to the stack of discs. The annealing cycle includes a 4 hour rise from room temperature to 600°F., followed by a 4 hour hold at 600°F., and followed by 16 hours of linear programmed temperature reduction to room temperature. The disc at this stage typically exhibits a flatness of 0.001 – 0.002 inch.

Each disc is then further smoothed on a lathe, such as a Bryant Symons Model 9530 Diamond Tool Lathe, with a spindle rotating at 800 r.p.m. and a cross slide feed rate of 0.01 inch per revolution. Two traverses of the cross slide are taken on each side of the disc. Two diamond tools are mounted on the cross slide, one single broad facet tool which first removes the bulk of the metal followed by a second single broad facet diamond which produces the desired fine surface finish. The later tool removes only 0.0001 – 0.0002 inch of metal. The quality of the diamond cutting edge is now believed to be as important as the balance and vibration-free characteristics of the lathe: the diamond should be near perfect when viewed at 200 X magnification. This procedure produces a disc with overall flatness of 0.002 – 0.003 inch, total indicator reading, and with a surface finish of 1.0 – 1.5 microinches, arithmetic average.

The disc is then cleaned by soaking for approximately five minutes in a non-etching alkali cleaner, such as 30 g/l MacDermid S 465 Metex soak cleaner, maintained at 150° – 160°F. The disc is then water rinsed, dipped in a 50% $HNO_3$ solution at room temperature and quickly removed after which it is again water rinsed.

The disc is immersed for one minute in a zincate bath maintained at 65°–75°F. The bath includes 120 g/l sodium hydroxide, 20 g/l zinc oxide, 50 g/l Rochelle salt, 2 g/l ferric chloride crystals and 1 g/l sodium nitrate. This is prepared by adding the sodium hydroxide and the zinc oxide to one-half the volume, and adding the remaining ingredients to the other half, dissolving the constituents separately, and then combining the two. This is for the purpose of activating the surfaces of the disc, and is followed by a water rinse.

The disc is next dipped in a 50% $HNO_3$ solution at room temperature to remove the zinc coating, and again water rinsed.

A second immersion for 30 seconds in the zincate bath described above, followed by a double water rinse, prepares the disc for the electroless deposit of nickel.

The disc is immersed for approximately 20–30 minutes in a plating bath comprising 10 g/l basic nickel carbonate, 6 m/l 70% hydrofluoric acid, 5.5 g/l citric acid, 10 g/l ammonium acid fluroide, 20 g/l sodium hypophosphite, plus ammonium hydroxide to adjust the pH to between 4.0 and 6.3 maintained at 170°–180°F. This bath is stable and easy to maintain, and provides a sufficiently smooth non-magnetic deposit on the disc. The nickel should be thick enough (0.2 to 0.4 mils) to prevent the acidic copper bath from attaching the zinc.

Following the deposition of electroless nickel, the disc is once again water rinsed, and then heat treated for at least one and preferably between one and two hours at 150°–200°C., and then cooled in air to room temperature. The nickel layer is activated by immersing the disc for 30 seconds in a 50% $H_2SO_4$ solution at room temperature, rinsing in water, subjecting it to a short cathodic alkaline cleaning at 180°–200°F., rinsing in water, and finally dipping in a 1% $H_2SO_4$ solution and thereafter water rinsing. Finally, a layer of copper approximately 1 mil thick is electroplated thereon from an acid copper bath at 30–40 asf. This procedure improves the surface leveling, providing a profile of less than 2 microinches (arithmetic average). Further polishing is possible with a very fine polishing agent and precision equipment.

A flat copper coated disc with satisfactory surface smoothness is thus provided, and the cobalt magnetic layer may be plated thereon by first electrolytic cleaning (if the disc has been dried) in an alkaline cleaner followed by a treatment for 30 seconds in a bright copper plating bath at 30–40 asf.

The disc is then electroplated for about six seconds at a current density of about 90 asf in the plating bath of the present invention containing 132 g/l of $CoCl_2 \cdot 6H_2O$ and 10.2 g/l of monochloroacetic acid neutralized with cobalt carbonate. A filtered rectified AC current is utilized for plating. The bath is maintained at room temperature and a pH of 4–4.5 during the electrodeposition. The geometry of the cobalt plating system is arranged so that all parts of the disc are plated at the same current density to get uniform coercivity and remanence. Since there is considerable difference between the top and bottom of a disc plated while stationary, the disc must be rotated to eliminate this effect, with plastic shields to control the plating distribution from the anode, which may be a ring of pure cobalt. The average thickness of the cobalt on the disc is about 7 microinches.

A protective coating, approximately 10 to 35 microinches thick is then applied to the cobalt layer. This coating is composed of an epoxy resin pigmented with up to 10% of finely divided aluminum oxide and is dissolved in a high boiling organic solvent. The disc is dipped in the coating and is centrifuged to remove excess material and evenly distribute the coating. The disc is then dried in a dust-free atmosphere after which it is ready for use.

EXAMPLE II

Deposition on a Flexible Substrate

The tape comprises, very basically, an elongated flexible mechanical support for the ferro-magnetic layer, such as a polyester base film of desired width and thickness. Tapes of polyamide or cellulose acetate, although not possessing all of the favorable characteristics of polyester, can likewise be utilized as a substrate. The non-magnetic side or back of the tape is coated with a conductive layer of a carbon-loaded plastic to eliminate static charge during computer operation. On the front or magnetic side of the tape, there is adhered to the polyester film a layer of plastic containing activating materials to form catalytic nuclei suitable for the plating of copper and to achieve improved surface smoothness. A layer of copper is chemically plated on the activated tape and the copper layer provides a suitable base for the electroplating of the extremely thin ferro-magnetic cobalt layer which provides the superior magnetic properties of the tape according to this invention. Finally, a protective coating of graphite is provided on the magnetic cobalt layer to complete the magnetic side of the tape.

The magnetic tape is fabricated in a continuous process which deposits the necessary layers in sequence. The first step consists of the provision of a roll of polyester base film approximately 0.0015 inch thick. Film three inches wide in rolls of about 3,500 linear feet are currently available from Celanese, FMC and others. The roll of film may be unwound according to conventional means and drawn through suitable apparatus for effectuating the following operations.

Second, the film as it is unwound is cleaned of foreign material in a manner which prepares the surface for the coatings which are next applied. It has been found satisfactory, for the purposes of this invention, to pass the film through a tank equipped for ultrasonic cleaning, and filled to a depth of 24 inches with hot trichlorethylene circulating through an external still. It has been found that film traveling through such a solution at approximately 11 feet per minute is immersed for about 20 seconds, and such cleaning operation is deemed satisfactory.

Third, a layer of a solution of 5–10% Saran F-120 or F-130 (a co-polymer of vinyl chloride and vinylidene chloride sold by Dow Chemical Co.) or other appropriate polymer with $LiAuCl_4 \cdot 2H_2O$ in a solvent, such as methyl ethyl ketone, methyl isobutyl ketone or mixtures thereof, is applied by roller coating with a steel roller. The $LiAuCl_4 \cdot 2H_2O$ is typically prepared by adding lithium hydroxide to tetrachloroauric acid solution in stoichiometric amount and evaporating to dryness on a water bath. The amount of gold in the Saran coating is not critical, but does have an effect on the time required to deposit the initial coating of copper, discussed below. Small amounts of gold require a longer time than larger amounts. Since other factors such as the composition of the electroless copper bath, its pH and temperature also effect the time for the initial coating of copper, however, the amount of gold used should for practical purposes be 0.1–1.5% of the weight of the dry Saran film. This dry film has a thickness of between 5 and 150 millionths of an inch.

In place of gold, a compound such as palladium acetate, in an amount of about 0.25% by weight, can be incorporated into the layer of vinyl chloride and vinylidine chloride followed by reduction of the acetate to a catalytic adduct thereof. Reduction is achieved, for example, by immersing the coating substrate into an aqueous reducing solution composed of dimethyl amine borane, sodium hypophosphite and n-propyl alcohol along with a wetting agent. The copper is then chemically plated on the surface followed by cobalt according to the procedure previously described.

Next a layer of copper is chemically plated on the smooth catalytically active Saran coating from a solution prepared as follows:

16.7 g copper formate crystals
107 cc of tetrasodium salt of ethylene-diamene Acetic acid (39% by weight)
80 cc of sodium hydroxide (25% by volume)

are made to one liter with water. When the plating solution is ready for use, 20 cc of 37% formaldehyde solution, 12 cc of 25% sodium hydroxide, 20 cc of isopropyl alcohol, and 1 cc of 1% Duponol WAQE (a wetting agent comprising laural alcohol sulfate) are added, after which the solution is heated to between 55°–60°C with air agitation to prevent spontaneous decomposition of the bath. This bath is capable of chemically plating a nearly opaque conductive copper layer on the moving film in 30 to 60 seconds for a period of about 45 minutes. The addition of more formaldehyde and sodium hydroxide allows the bath to be used for a longer period of time while the addition of more copper formate solution serves to replace the copper that is plated out. A copper film thickness of less than 5 millionths of an inch has been found to be satisfactory. This electroless copper plate obtained in 30 to 60 seconds with the aforementioned bath is sufficiently conductive to act as a base for the subsequent electrodeposit of cobalt at medium current densities. However, a second layer of copper can be electrodeposited as an optional step on top of the chemically deposited layer, prior to the deposition of the cobalt layer. This will increase the conductivity and allow the use of higher current densities during the cobalt deposition. A 30 second electrodeposit at e.g. 40 amps from a bright acid copper bath such as a sulfate or fluoborate bath has been found to be suitable for the deposit of this second copper layer.

Preparatory to depositing the cobalt layer, it is necessary that the copper layer be rinsed and dried of surface liquids. A final rinse in alcohol which eliminates water droplets and evaporates rapidly has been found to prevent local dilution of the cobalt solution which is next applied.

Next, a layer of cobalt is applied to the conductive surface by electroplating techniques. This is accompalished by providing a tank containing a cobalt chloride solution, such as a 20% by weight solution of cobalt chloride hexahydrate ($CoCl_2 \cdot 6H_2O$) in water. The solution is maintained at a constant pH by the incorporation of a buffer comprising the cobalt salt of mono chloroacetic acid. The pH range is maintained between about 3.6 and 5.8, more preferably between about 4.0 and 5.0. A solid slab of electrolytic cobalt metal immersed in the solution serves as the anode, and the copper layer on the film which is passed through the solution acts as the cathode. A current density which averages about 400 amperes per square foot on the moving tape is satisfactory. At least about 150 amperes per square foot is apparently necessary to attain the desirable features of this invention, and at least double that value is preferred. The cobalt chloride solution is maintained at a temperature of between 18° and 24°C, and it is now believed that the lower end of this range is preferable. More important than the particular level of the temperature, it now appears that the primary consideration is maintaining a constant temperature during the plating operation and avoiding fluctuations up or down from that temperature.

A graphite coating is applied to the cobalt from a graphite dispersion. This coating is applied in a very thin layer and is tenaciously adherent to the cobalt. It may, if necessary, be burnished to remove excess material to avoid contaminating the "read" and "write" heads of the computer on which the tape is used. Such a layer provides protection against chipping, abrasion and the like which give rise to fault counts in previously available tapes. The graphite layer protects the cobalt from direct contact with the guides, rollers, tensioning devices, cleaning knives, wiping pads, and similar equipment found in digital computers.

Lastly, a layer of carbon-loaded plastic is applied to the back side of the polyester base film to provide electrical conductivity in order to remove static charge from the tape during operation. Finally, the completed tape is wound up into a roll suitable for slitting to proper widths for various uses, such as use in digital computers.

While the above described embodiments constitute two modes of practicing the invention, other embodiments and equivalents are within the scope of the actual invention.

It is clear that a cobalt layer can be electrolytically applied from this novel bath to any suitable conductive surface to produce a superior ferromagnetic layer.

Furthermore, changes can be made in the amounts of the ingredients and the plating conditions without departing from the invention which is limited only by the claims in which we claim:

1. The method of electrodepositing a thin ferromagnetic cobalt layer, having a nominal coercivity between about 200 oersteds and 500 oersteds, upon a conductive copper base, said layer composed of hexagonal crystals of cobalt and having a thickness of between about 4 and about 20 microinches, comprising:

a. Preparing an aqueous electroplating bath consisting of cobalt chloride buffered with a low molecular weight carboxylic acid selected from the group consisting of monochloro acetic acid, acetic acid, diglycolic acid, and malonic acid in a pH range of between about 3.5 and 5.8, and b. Plating the cobalt onto the copper-base submerged in the bath while maintaining the bath at a temperature of between 18°C and about 24°C said plating conducted at a current density of at least 90 amps per square foot using a cobalt anode.

2. The process of claim 1 wherein the cobalt is electrodeposited from the bath using a filtered, rectified AC current.

3. The process according to claim 1 wherein the copper base is deposited upon a substrate comprising a rigid disc and the current density is at least 90 amps per square foot.

4. The process of claim 1 wherein the copper base is deposited upon a thin flexible substrate and the cobalt is deposited on the base at a current density of at least 150 amps per square foot as the substrate is moving continuously through the plating bath.

5. The method of electrodepositing a thin ferromagnetic cobalt layer upon a conductive copper base, said layer having a nominal coercivity between about 200 and about 500 oersteds, and composed of hexagonal crystals of cobalt, comprising plating the cobalt onto the substrate from an aqueous electroplating bath consisting of cobalt chloride buffered with one or more low molecular weight carboxylic acids selected from the group consisting of mono-chloro acetic acid, acetic acid, diglycolic acid, and malonic acid, said bath maintained at a temperature of between about 18°C and about 24°C. and a pH in the range of between about 3.5 and about 5.8, said plating conducted at a current density of at least 90 amps per square foot using a cobalt anode.

6. A ferro-magnetic layer composed of close packed hexagonal crystals of cobalt, said layer having a thickness of between about four and about twenty microinches and deposited on a conductive substrate from the aqueous bath according to the method of claim 1.

* * * * *